Oct. 5, 1926.  
E. T. OLSON  
1,601,878  
COMBINED HITCH AND DRAWBAR FOR TRACTORS  
Filed April 19, 1926
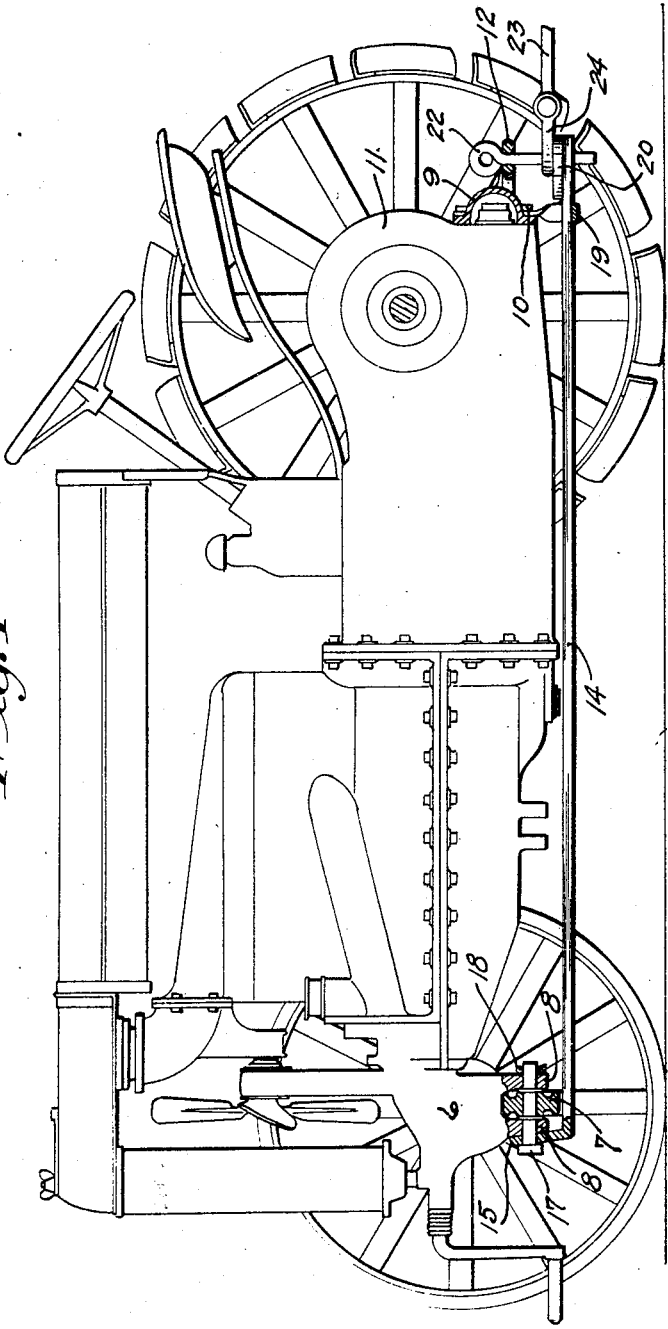
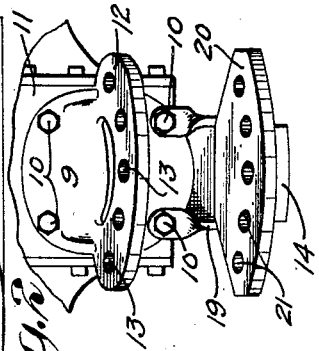
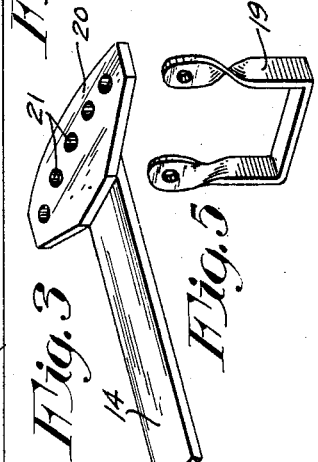
Inventor  
Ephraim T. Olson  
By his Attorneys  
Merchant and Kilgore Patented Oct. 5, 1926.

1,601,878

UNITED STATES PATENT OFFICE.

EPHRAIM T. OLSON, OF PEPIN, WISCONSIN.

COMBINED HITCH AND DRAWBAR FOR TRACTORS.

Application filed April 19, 1926. Serial No. 102,956.

My invention has for its object to provide a simple and highly efficient combined hitch and draw bar intended for general use but especially adapted for use on Fordson tractors. As is well known, such tractors, when pulling unusually heavy loads, laboring in soft ground, or climbing hills, are liable to rear on their traction wheels and fall over backward, due to the driving force on the differential mechanism on the rear axle structure.

The combined hitch and draw bar is designed to be attached to a Fordson tractor both at the front and rear ends thereof and below the wheel axles for a direct pull in the line of travel. By thus attaching the combined hitch and draw bar to a tractor, the front end of said tractor is held down, thus keeping its front wheels on the ground so that it is impossible for the tractor to rear backward on its traction wheels. Furthermore, this method of attaching a combined hitch and draw bar distributes the pulling strain on the tractor so that the same is borne on both ends thereof, thus relieving the rear coupling head from undue pulling strain.

The invention also provides means for attaching the combined hitch and draw bar to a tractor without drilling, cutting or tapping any of the parts thereof.

In the accompanying drawings, which illustrate the invention, like characters indicate like parts throughout the several views.

Referring to the drawings:

Fig. 1 is a view principally in side elevation of a Fordson having the invention applied thereto;

Fig. 2 is a fragmentary perspective view of the draw bar cap and the combined hitch and draw bar;

Fig. 3 is a fragmentary perspective view of the combined hitch and draw bar;

Fig. 4 is a perspective view of the trunnion; and

Fig. 5 is a perspective view of the hanger bracket.

Of the parts of the Fordson tractor illustrated it is important to note the cylinder front cover 6, front axle 7, front and rear depending lugs 8 on said cover and between which said axle extends, draw bar cap 9, upper and lower pairs of bolts 10, securing said cap to the transmission housing 11, and coupling head 12 formed with the cap 9 and provided with a plurality of coupling pin holes 13 spaced on an arc transversely of the tractor.

It will be noted that the front axle 7 and lugs 8 have aligned trunnion seats for the commercial form of the trunnion connecting the front axle 7 to the lugs 8 to permit oscillatory movement of said axle in a vertical plane transversely of the tractor.

Referring now in detail to the invention the numeral 14 indicates a combined hitch and draw bar that extends longitudinally under the tractor and has an upturned front end portion 15 that engages the front face of the front lug 8 as an abutment and has a trunnion seat 16 axially aligned with the trunnion seats in the axles 7 and lugs 8.

A relatively long headed trunnion 17, substituted for the original relatively short trunnion, is inserted through the trunnion seats 16 and through the aligned trunnion seats in the axles 7 and lugs 8 and held in place by a cotter pin 18. The trunnion 17 not only connects the front axle 7 to the tractor but affords a connection for the front end of the combined hitch and draw bar.

The rear end portion of the bar 14 loosely rests on the transverse bar of a U-shaped hanger bracket 19 secured to the draw bar cap 9 by the lower pair of attaching bolts 10. On the rear end of the bar 14, rearward of the hanger bracket 19, is a coupling head 20 having a plurality of coupling pin holes 21 coincident with the overlying coupling pin holes 13. A headed pin 22 is adapted to be inserted through any one pair of the coincident holes 13 and 21. A draft pole 23 is attached by a clevis 24 to the pin 22.

The pole 23 may be attached to a truck or any other form of farm implement to be drawn by the tractor. From the above description it is evident that the combined hitch and draw bar can be attached to a Fordson tractor simply by substituting a longer trunnion for the commercial form of trunnion and attaching the hanger bracket 19 to the draw bar cap 9 by a pair of its attaching bolts 10. By shifting the pin 22 in different coincident holes 13 and 21 the line of side draft may be varied at will.

The above described invention, while extremely simple and of small cost to manufacture has, in actual usage, proven highly efficient for the purpose had in view.

What I claim is:

1. The combination with a tractor having a rear coupling head provided with a plurality of coupling pin holes spaced transversely of the tractor, of a combined hitch and draw bar extending longitudinally of the tractor and having its front end attached to the tractor and engaging a part thereon as an abutment below the axis of the front wheels of the tractor, said bar having a coupling head provided with coupling pin holes coincident with said holes in the first noted coupling head, and a coupling pin adapted to be inserted through any one pair of said coincident coupling pin holes.

2. The combination with a tractor having a trunnion connecting its front axle thereto and also having a coupling head provided with a plurality of coupling pin holes spaced transeversely of the tractor, a U-shaped hanger bracket attached to the tractor, a combined hitch and draw bar having its rear portion carried by said bracket, said bar having an apertured upturned front end through which said trunnion extends and engaging a part on the tractor as an abutment, a coupling head on the rear end of said bar provided with a plurality of coupling pin holes coincident with said holes in the first noted coupling head, and a coupling pin adapted to be inserted through any one pair of said coincident pin holes.

3. The combination with a tractor having a cylinder front cover provided with depending front and rear lugs, a front axle extending between said lugs, said lugs and axle having aligned trunnion seats, said tractor also having a draw bar cap, bolts attaching said cap to the tractor, and a coupling head on said cap provided with a plurality of coupling pin holes spaced transversely of the tractor, of a U-shaped hanger bracket secured to said cap by certain of its attaching bolts, a combined hitch and draw bar inserted through said bracket and having an apertured upturned front end engaging said front lug as an abutment, a trunnion inserted through the apertured front end of said bar and aligned seats in said lugs and front axle, said bar having at its rear end a coupling head provided with coupling pin holes coincident with said holes in the first noted coupling head, and a coupling pin adapted to be inserted through any one pair of said coincident coupling pin holes.

In testimony whereof I affix my signature.

EPHRAIM T. OLSON.